US012773711B2

(12) United States Patent
Courbat et al.

(10) Patent No.: US 12,773,711 B2
(45) Date of Patent: Oct. 27, 2026

(54) VAPING DEVICE AND METHOD FOR AEROSOL-GENERATION

(71) Applicant: Altria Client Services LLC, Richmond, VA (US)

(72) Inventors: Jerome Christian Courbat, Neuchatel (CH); Oleg Mironov, Cudrefin (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/348,852

(22) Filed: Jul. 7, 2023

(65) Prior Publication Data

US 2023/0356252 A1 Nov. 9, 2023

Related U.S. Application Data

(63) Continuation of application No. 15/473,846, filed on Mar. 30, 2017, now Pat. No. 11,717,845, which is a (Continued)

(30) Foreign Application Priority Data

Mar. 30, 2016 (EP) .................................... 16162973

(51) Int. Cl.
*A24F 40/40* (2020.01)
*A24F 40/10* (2020.01)
(Continued)

(52) U.S. Cl.
CPC ...... *B05B 17/0684* (2013.01); *B05B 17/0607* (2013.01); *B05B 17/0661* (2013.01);
(Continued)

(58) Field of Classification Search
None
See application file for complete search history.

(56) References Cited

U.S. PATENT DOCUMENTS 6,679,436 B1 1/2004 Onishi et al.
7,516,714 B2 4/2009 Yamagata et al.
(Continued)

FOREIGN PATENT DOCUMENTS

CN 1962080 A 5/2007
CN 101726539 A 6/2010
(Continued)

OTHER PUBLICATIONS

Philippines Notice of Allowance dated Jun. 13, 2024 for corresponding Philippines Patent Application No. 1-2018-501818.
(Continued)

*Primary Examiner* — Philip Y Louie
*Assistant Examiner* — Sonny V Nguyen
(74) *Attorney, Agent, or Firm* — Harness, Dickey & Pierce, P.L.C.

(57) ABSTRACT

A smoking device for aerosol-generation may comprise a device housing, a surface acoustic wave-atomizer (SAW-atomizer), a supply element, and a control system. The device housing may include a storage portion for an aerosol-forming substrate. The SAW-atomizer may include an atomization region, a first transducer, and/or a second transducer. The first transducer is configured to generate first surface acoustic waves that propagate along a surface of the SAW-atomizer. The supply element is arranged to supply the aerosol-forming substrate from the storage portion to the atomization region of the SAW-atomizer. The control system is configured to operate the SAW-atomizer to atomize the aerosol-forming substrate in the atomization region to generate an aerosol. A cartridge for such a smoking device and a method for generating an aerosol in a smoking system are also provided.

18 Claims, 3 Drawing Sheets

Related U.S. Application Data continuation of application No. PCT/EP2017/054668, filed on Feb. 28, 2017.

(51) Int. Cl.

| | |
|---|---|
| ***B05B 17/06*** | (2006.01) |
| *A24F 40/05* | (2020.01) |
| *A24F 40/44* | (2020.01) |
| *A24F 40/46* | (2020.01) |
| *A24F 40/50* | (2020.01) |

(52) U.S. Cl.

CPC .......... *B05B 17/0669* (2013.01); *A24F 40/05* (2020.01); *A24F 40/10* (2020.01); *A24F 40/40* (2020.01); *A24F 40/44* (2020.01); *A24F 40/46* (2020.01); *A24F 40/50* (2020.01)

(56) References Cited

U.S. PATENT DOCUMENTS

| | | | | |
|---|---|---|---|---|
| 7,832,410 | B2 | 11/2010 | Hon | |
| 8,991,722 | B2 | 3/2015 | Friend et al. | |
| 2005/0083785 | A1 | 4/2005 | Shiokawa et al. | |
| 2005/0126480 | A1* | 6/2005 | Yamagata | B05B 17/0607 118/621 |
| 2006/0272416 | A1* | 12/2006 | Liu | G01F 1/6845 73/592 |
| 2007/0080245 | A1 | 4/2007 | Lin et al. | |
| 2008/0055022 | A1* | 3/2008 | Koehnke | H03H 9/02834 333/193 |
| 2008/0084135 | A1 | 4/2008 | Ramsesh et al. | |
| 2008/0223953 | A1* | 9/2008 | Tomono | A61M 11/005 128/200.16 |
| 2012/0048266 | A1 | 3/2012 | Alelov | |
| 2012/0234818 | A1 | 9/2012 | Martin et al. | |
| 2013/0330247 | A1 | 12/2013 | Wilson et al. | |
| 2014/0197714 | A1 | 7/2014 | Martin et al. | |
| 2014/0203099 | A1 | 7/2014 | Wolfe et al. | |
| 2015/0090277 | A1 | 4/2015 | Xiang | |
| 2015/0216237 | A1 | 8/2015 | Wensley et al. | |
| 2015/0245654 | A1 | 9/2015 | Memari et al. | |
| 2015/0245665 | A1 | 9/2015 | Memari et al. | |
| 2016/0001316 | A1* | 1/2016 | Friend | B06B 1/0644 128/200.16 |
| 2017/0178884 | A1* | 6/2017 | Murtazin | G01J 3/443 |

FOREIGN PATENT DOCUMENTS

| | | | |
|---|---|---|---|
| CN | 102458684 | A | 5/2012 |
| CN | 102985190 | A | 3/2013 |
| CN | 103338663 | A | 10/2013 |
| CN | 204132398 | U | 2/2015 |
| CN | 104509976 | A | 4/2015 |
| CN | 104983078 | A | 10/2015 |
| CN | 204724386 | U | 10/2015 |
| CN | 204994622 | U | 1/2016 |
| CN | 105377455 | A | 3/2016 |
| EA | 22685 | B1 | 2/2016 |
| EP | 1602414 | A2 | 12/2005 |
| EP | 2468118 | A1 | 6/2012 |
| GB | 2491358 | A | 12/2012 |
| GB | 2548071 | A | 9/2017 |
| JP | H1034909 | A | 2/1998 |
| JP | H11-114467 | A | 4/1999 |
| JP | 03626222 | B2 | 3/2005 |
| JP | 2005111471 | A | 4/2005 |
| JP | 2007-532118 | A | 11/2007 |
| JP | 2008073570 | A | 4/2008 |
| JP | 2008-104974 | A | 5/2008 |
| JP | 2008104966 | A | 5/2008 |
| JP | 2008-238058 | A | 10/2008 |
| JP | 2009154058 | A | 7/2009 |
| JP | 2012024646 | A | 2/2012 |
| JP | 04915567 | B2 | 4/2012 |
| JP | 2012148256 | A | 8/2012 |
| JP | 2012/192377 | A | 10/2012 |
| JP | 2012/196615 | A | 10/2012 |
| JP | 2012/196616 | A | 10/2012 |
| JP | 05518437 | B2 | 6/2014 |
| JP | 2015013234 | A | 1/2015 |
| JP | 7232279 | B2 | 3/2023 |
| RU | 2336002 | C2 | 10/2008 |
| WO | WO-2002/072169 | A2 | 9/2002 |
| WO | WO-2007/128045 | A1 | 11/2007 |
| WO | WO-2010/047110 | A1 | 4/2010 |
| WO | WO-2010/129994 | A1 | 11/2010 |
| WO | 2012026963 | A2 | 3/2012 |
| WO | WO-2013/166542 | A1 | 11/2013 |
| WO | WO-2013/174001 | A1 | 11/2013 |
| WO | WO-2014/132228 | A1 | 9/2014 |
| WO | WO-2015/115417 | A1 | 8/2015 |

OTHER PUBLICATIONS

Korean Office Action dated Jun. 21, 2024 for corresponding Korean Patent Application No. 10-2018-7026582 and its English-language translation.

International Search Report and Written Opinion for Application No. PCT/EP2017/054668 dated Aug. 3, 2017.

Aisha Qi et al., "A Miniaturized Surface Acoustic Wave Atomizer with a Disposable Pump-free Liquid Supply System for Continuous Atomization," Proceedings of the 2011 6th IEEE International Conference on Nano/Micro Engineered and Molecular Systems, Feb. 20-23, 2011, Kaohsiung, Taiwan, pp. 295-298.

Haiyan Li, "A scaffold cell seeding method driven by surface acoustic waves", Micro/Nanophysics Research Laboratory, Monash University, Clayton, VIC 3800, Australia, 2007, pp. 4098-4104.

David J. Collins et al., "Atomization off thin water films generated by high-frequency substrate wave vibrations," Physical Review E 86, American Physical Society, 2012, pp. 056312-1-056312-9.

James R. Friend et al., "Evaporative self-assembly assisted synthesis of polymeric nanoparticles by surface acoustic wave atomization," IOP Publishing, Nanotechnology 19, 2008, pp. 1-6.

Anushi Rajapaksa et al., "Enabling practical surface acoustic wave nebulizer drug delivery via amplitude modulation," The Royal Society of Chemistry, Lab Chip, 2014, pp. 1858-1865.

Anushi Rajapaksa et al., "Effective pulmonary delivery of an aerosolized plasmid DNA vaccine via surface acoustic wave nebulization," Respiratory Research, 2014, pp. 1-12.

Aisha Qi et al., "Interfacial destabilization and atomization driven by surface acoustic waves," Physics of Fluids, 2008, pp. 074103-1-074103-14.

Kar M. Ang et al., "Nozzleless spray cooling using surface acoustic waves," Journal of Aerosol Science 79, 2015, pp. 48-60.

Aisha Qi et al., "Miniature inhalation therapy platform using surface acoustic wave microfluidic atomization," The Royal Society of Chemistry, Lab on a Chip, 2009, pp. 2184-2193.

Aisha Qi et al., "The Extraction of Liquid, Protein Molecules and Yeast Cells From Paper Through Surface Acoustic Wave Atomization," Lab on a Chip: Miniaturisation for Chemistry, Physics, Biology and Bioengineering, vol. 10, No. 4, Oct. 12, 2009, pp. 470-476.

S. Anand et al., "Aerosol droplet optical trap loading using surface acoustic wave nebulization," SUPA, Division of Physics, School of Engineering, Physics and Mathematics, University of Dundee, Nethergate, Dundee, UK, Dec. 2, 2013, pp. 30148-30155.

Scott R. Heron et al., "Surface Acoustic Wave Nebulization of Peptides as a Microfluidic Interface for Mass Spectrometry," NIH Public Access Author Manuscript, *Anal Chem.* Author manuscript; May 15, 2011, pp. 1-11.

Minoru Kurosawa et al., "Characteristics of Liquids Atomization Using Surface Acoustic Wave," Dept. of Precision Machinery Engineering, The University of Tokyo, Transducers 97, Jun. 16-19, Chicago, pp. 801-804.

Jungmyoung Ju et al., "Standing wave type surface acoustic wave atomizer," Sensors and Actuators A: Physical, 2008, pp. 570-575.

(56) References Cited

OTHER PUBLICATIONS

Minoru Kurosawa et al., "Surface acoustic wave atomizer," Sensors and Actuators A: Physical, Sep. 21, 1995, pp. 69-74.
X. J. Guo et al., "Nebulization of water/glycerol droplets generated by ZnO/Si surface acoustic wave devices," Microfluidics and Nanofluidics, Springer, Oct. 28, 2014, pp. 1-10.
Search Report for corresponding European Application No. 16162973.8 dated Sep. 6, 2016.
International Preliminary Report for Application No. PCT/EP2017/054668 dated Mar. 9, 2018.
Russian Notice of Allowance and Search Report dated Apr. 14, 2020 for corresponding Russian Application No. 2018136258/12(059947).
Search Report for European Application No. 20185728.1 dated Oct. 21, 2020.
Notification of the First Office Action and Search Report issued Oct. 9, 2020 in Chinese Application No. 201780015524.
Zou Xiao-hong et al., "Chemical Sensors," The Design of Surface Acoustic Wave Gas Sensors, vol. 20, No. 3, Sep. 2000.
Office Action for Taiwanese Application No. 106109082 dated Oct. 29, 2020 and English translation.
Examination Report for corresponding Indian Application No. 201817026707 dated Nov. 6, 2020.
Notice of Allowance dated Feb. 15, 2021 issued in corresponding Japanese Patent Application No. 2018-549539.
Office Action for Chinese Application No. 201780015524, dated May 20, 2021.
Ishigami, Yohei, "Machine translation of JP 2012-148256," Translated Jun. 17, 2021, Espacenet.com. (Year: 2021).
Australian Examination Report for corresponding Application No. 2017243763, dated Nov. 19, 2021.
Ukrainian Notice of Allowance for corresponding Application No. 201808935, dated Oct. 22, 2021.
Chinese Rejection Decision for corresponding Application No. 201780015524, dated Nov. 3, 2021.
Brazilian Office Action for corresponding Application No. 1120180677230, dated Sep. 28, 2021, English translation included herewith.
Japanese Office Action for corresponding Application No. 2021-043500, dated May 25, 2022, with English Translation.
Malaysian Notice of Allowance for corresponding Application No. PI2018702969, dated Jul. 7, 2022.
Brazilian Office Action for corresponding Application No. 1120180677230, dated Jul. 12, 2022, English translation included herewith.
Australian Notice of Acceptance for corresponding Application No. 2017243763, dated Sep. 21, 2022.
Philippine Office Action for corresponding Application No. 1-2018-501818, dated Dec. 21, 2022.
Japanese Notice of Allowance for corresponding Application No. 2021-43500, dated Jan. 18, 2023, English Translation included.
Japanese Notice of Allowance and English translation thereof for Japanese Application No. 2023-023373 mailed Feb. 29, 2024.
Chinese Board Opinion dated Mar. 29, 2024 for corresponding Chinese Patent Application No. 201780015524.X and its English-language translation.
Indian Office Action dated Nov. 29, 2023 for Indian Patent Application No. 201817026707.
Russian Decision to Grant for Russian Application No. 2020137530 and English translation thereof dated Dec. 1, 2023.
Board Decision dated Jul. 17, 2024 for corresponding Chinese Patent Application No. 201780015524.X and its English-language translation.
Korean Notice of Allowance dated Feb. 17, 2025 for corresponding Korean Patent Application No. 10-2018-7026582 and its English-language translation.
Japanese Office Action issued in Japenese Patent Application No. 2024-059165, dated Apr. 3, 2025.
Extended European Search Reported issued in European Patent Application No. 25188886.3, dated Sep. 18, 2025.
Notice of Allowance issued in Japanese Patent Application No. 2024-059165, dated Sep. 9, 2025.
Korean Notice of Allowance for corresponding Korean Application No. 10-2025-7015452 dated Jul. 14, 2026.
Notice of Opposition for corresponding Application No. 20185728.1, dated May 27, 2026.

* cited by examiner

VAPING DEVICE AND METHOD FOR AEROSOL-GENERATION

CROSS-REFERENCE TO RELATED APPLICATIONS

This is a continuation of U.S. application Ser. No. 15/473,846, filed on Mar. 30, 2017, which is a continuation of and claims priority to PCT/EP2017/054668, filed on Feb. 28, 2017, and further claims priority to EP 16162973.8, filed on Mar. 30, 2016, each of which are hereby incorporated by reference in their entirety.

BACKGROUND

Field

Example embodiments relate to smoking devices, methods, and smoking systems for the aerosol generation of an aerosol-forming substrate, and cartridges for such smoking devices. The smoking device and aerosol-generating system are electrically operated devices and systems.

Description of Related Art

In electrically operated smoking systems for example, a liquid aerosol-forming substrate is atomized to form an aerosol. Typically, in atomizers, a coil of heater wire is wound around an elongate wick that is soaked in a liquid aerosol-forming substrate. Other types of atomizers use ultrasonic vibrations, rather than heat, to atomize a liquid substrate. In such devices, vibrations are used to push or draw a liquid through a mesh to atomize the liquid. A problem with many atomizers using ultrasonic vibrations is that they are not able to atomize relatively viscous liquids, such as those typically used in electrically operated smoking systems. In addition, many atomizers require relatively high power to achieve a desired atomization rate.

SUMMARY

According to some example embodiments, there is provided a smoking device for aerosol-generation of a liquid aerosol-forming substrate. The smoking device may comprise a device housing comprising a storage portion (e.g., liquid storage portion) comprising a housing for holding an aerosol-forming substrate (e.g., liquid aerosol-forming substrate). The device housing may, for example, comprise a cavity for receiving a cartridge therein, the cartridge comprising a liquid aerosol-forming substrate. The smoking device may further comprise a surface acoustic wave-atomizer (SAW-atomizer) comprising an atomization region, at least one transducer for generating surface acoustic waves to propagate along a surface of the SAW-atomizer including the atomization region and at least a second transducer. A supply element is arranged to supply a liquid aerosol-forming substrate from the liquid storage portion to the atomization region on the SAW-atomizer. The supply element may fluidly connect the liquid storage portion (e.g., a cartridge) and the SAW-atomizer, in particular the atomization region on the SAW-atomizer. A control system is configured to operate the SAW-atomizer for atomizing the liquid aerosol-forming substrate in the atomization region to generate an aerosol. The control system may, for example, comprise a power source and control electronics connected to the SAW-atomizer. The control system is, for example, adapted to provide an RF-signal to the at least one transducer. The generated aerosol may then be transported in the device housing to a downstream end of the smoking device.

In use, the device may be operated by utilizing a switch or by applying a negative pressure to a mouthpiece of the device. Power may be provided to the SAW-atomizer by activating the at least one transducer to produce surface acoustic waves (Rayleigh-waves) to propagate along the surface of the SAW-atomizer. The energy of these surface acoustic waves is transferred into the liquid aerosol-forming substrate supplied to the atomization region. The energy supplied into the liquid causes the formation of aerosol droplets of the liquid aerosol-forming substrate, thus atomizing the liquid aerosol-forming substrate from the atomization region. The surface acoustic waves transferred into the liquid basically destabilize the liquid droplet on the surface of the SAW-atomizer such that the surface of the droplet breaks up and forms a mist of aerosol droplets.

This manner of generating aerosol can provide a more reliable and consistent amount of aerosol from a liquid aerosol-forming substrate. In addition, such aerosol generation requires less power than when generated with known vibration elements, for example those using solely heat.

As a SAW-atomizer, commonly known SAW-sensor chips may be used. These typically comprise at least an interdigital (or interdigitated) transducer comprising (metal) electrodes arranged on a piezoelectric substrate, for example, printed onto the substrate. An AC voltage applied to the individual 'fingers' of the transducer electrodes cause the piezoelectric substrate to mechanically deform due to alternating regions of tensile and compressive strain in the piezoelectric substrate created between the fingers. As fingers on the same side of the transducer are at the same level of compression or tension, the space between them (known as pitch) corresponds to the wavelength of the mechanical wave.

The generated waves typically have nanometer-size amplitudes and propagate along the surface of the piezoelectric substrate at MHz frequencies.

In an example embodiment, the at least one transducer of the SAW-atomizer used in the smoking device is an interdigital transducer comprising electrodes arranged on a piezoelectric substrate.

A transducer may comprise a reflector to support a directionality of the generated surface acoustic waves into one direction. By doing this, the power efficiency of a system may be increased.

A transducer may be configured to generate parallel waves, for example, by an array of straight electrodes arranged in parallel.

A transducer may be configured to have a focusing effect of the generated waves. For example, the transducer may be provided with electrodes having parallel but curved shapes such as to focus the generated wave onto a relatively small zone.

In a non-limiting embodiment, a transducer may comprise a reflector that has a focusing effect.

The control system of the smoking device is configured to operate the SAW-atomizer to generate surface acoustic waves at a predetermined, target, or desired frequency. The predetermined, target, or desired frequency may be about 20 MHz or higher, which may for example be between about 20 MHz and about 100 MHz or between about 20 MHz and about 80 MHz. This may provide a desired aerosol-output rate and a desired droplet size for an improved vaping experience.

The control system may comprise electric circuitry connected to the SAW-atomizer and a power source.

The electric circuitry may comprise a microprocessor, which may be a programmable microprocessor. The electric circuitry may comprise further electronic components. The electric circuitry may be configured to regulate a supply of power to the SAW-atomizer Power may be supplied to the SAW-atomizer continuously following activation of the device or may be supplied intermittently, such as on a puff-by-puff basis.

The SAW-atomizer may be any suitable shape. For instance, the SAW-atomizer may be substantially circular or elliptical (e.g., substantially circular or elliptical disc). In another instance, the SAW-atomizer may be substantially triangular or square (e.g., substantially square plate) or any regular or irregular shape. In an example embodiment, the SAW-atomizer may also be substantially flat. Alternatively, the SAW-atomizer may be curved. For example, the SAW-atomizer may be dome-shaped.

The SAW-atomizer may be reusable. Alternatively, the SAW-atomizer may be disposable. The SAW-atomizer may be a separate element or may be part of a cartridge as will be described in further detail below.

SAW-atomizers are generally small and light-weight. In addition, SAW-atomizers, in particular those having sizes suitable for use in electrically operated smoking devices, use less power than known vibration elements, for example those using heat for aerosol production. Furthermore, SAW-atomizers generally have the ability to generate relatively small droplet-sized aerosol. These advantages of SAW-atomizers enable the provision of a more efficient and economic smoking device.

The smoking device according to a non-limiting embodiment may further comprise a heater arranged to heat an aerosol-forming substrate, for example, a liquid aerosol-forming substrate in the atomization region. The heater may be arranged to heat at least a portion of the SAW-atomizer and, as a result, the aerosol-forming substrate on the SAW-atomizer. For instance, the heater may be arranged to heat at least the atomization region of the SAW-atomizer and, as a result, the aerosol-forming substrate in the atomization region.

The heater may heat the liquid aerosol-forming substrate and reduce the viscosity and the surface tension of the liquid thereon. By heating the liquid (e.g., before but also during atomization), the heater may increase the rate of atomization. Heating the aerosol-forming substrate and reducing the viscosity of the liquid aerosol-forming substrate may increase the reliability of the device or the smoking system.

The heater may heat the liquid aerosol-forming substrate to a consistent, predetermined, target, or desired temperature for atomization. This may enable atomization of the aerosol-forming substrate at a consistent viscosity, and may enable generation of an aerosol by the device at a consistent rate of atomization. This may improve a vaping experience.

The viscosity of the liquid aerosol-forming substrate may have an effect on the rate of atomization and on the droplet size of the aerosol generated by the device or system. Therefore, heating the liquid aerosol-forming substrate to a consistent, predetermined, target, or desired temperature before atomization may facilitate the generation of an aerosol having a more consistent distribution of droplet sizes.

Heating the liquid aerosol-substrate to a temperature above ambient temperature before atomization may also reduce the sensitivity of the system to fluctuations in ambient temperature and provide a more consistent aerosol generation.

As used herein, the term 'droplet size' is used to mean the aerodynamic droplet size, which is the size of a spherical unit density droplet that settles with the same velocity as the droplet in question. Several measures are used in the art to describe aerosol droplet size. These include mass median diameter (MMD) and mass median aerodynamic diameter (MMAD). As used herein, the term 'mass median diameter (MMD)' is used to mean the diameter of a droplet such that half the mass of the aerosol is contained in small diameter droplets and half in large diameter droplets. As used herein, the term 'mass median aerodynamic diameter (MMAD)' is used to mean the diameter of a sphere of unit density that has the same aerodynamic properties as a droplet of median mass from the aerosol.

The mass median aerodynamic diameter (MMAD) of the droplets generated by the smoking device and system may be between about 1 μm and about 10 μm (e.g., the MMAD of the droplets may be between about 1 μm and about 5 μm). For instance, the MMAD of the droplets may be equal to or less than 3 μm. The desired droplet size of the droplets generated by the smoking device may be any MMAD described above. In an example embodiment, the desired droplet size (MMAD) may be equal to or less than 3 μm.

The control system of the smoking device may be configured to operate the heater to heat the liquid aerosol-forming substrate to a predetermined, target, or desired temperature, for example, by heating at least a portion of the SAW-atomizer to a predetermined, target, or desired temperature. The predetermined, target, or desired temperature may be above ambient temperature. For instance, the predetermined, target, or desired temperature may be above room temperature. This may reduce the viscosity as well as the surface tension of the aerosol-forming substrate compared to the viscosity of the unheated aerosol-forming substrate. This may also increase the rate of atomization and may facilitate generation of an aerosol having desirable droplet sizes. This may reduce the sensitivity of the system to fluctuations in ambient temperature. The predetermined, target, or desired temperature may be below the vaporization temperature or lower than the boiling point of the liquid aerosol-forming substrate. The predetermined, target, or desired temperature may be between 18 degrees Celsius and 80 degrees Celsius, between 30 degrees Celsius and 60 degrees Celsius, or between 35 degrees Celsius and 45 degrees Celsius. In another instance, the predetermined, target, or desired temperature may be between 20 degrees Celsius and 30 degrees Celsius, between 30 degrees Celsius and 40 degrees Celsius, between 40 degrees Celsius and 50 degrees Celsius, between 50 degrees Celsius and 60 degrees Celsius, between 60 degrees Celsius and 70 degrees Celsius, or between 70 degrees Celsius and 80 degrees Celsius. A predetermined, target, or desired temperature of a heated portion of the SAW-atomizer may correspond to the predetermined, target, or desired temperature of the liquid aerosol-forming substrate in the atomization region.

As used herein, the term 'ambient temperature' refers to the air temperature of the surrounding environment in which the aerosol-generating device or system is being used. Ambient temperature typically corresponds to a temperature between about 10 degrees Celsius and 35 degrees Celsius. As used herein, the term 'room temperature' refers to a standard ambient temperature and pressure, typically a temperature of about 25 degrees Celsius and an absolute pressure of about 100 kPa (1 atm).

The control system configured to operate the heater may be integral with or separate from the control system of the smoking device.

The control system may comprise electric circuitry connected to the heater and to an electrical power source. The electric circuitry may be configured to monitor the electrical resistance of the heater and to control the supply of power to the heater dependent on the electrical resistance of the heater. The electric circuitry may comprise a microprocessor, which may be a programmable microprocessor. The electric circuitry may comprise further electronic components. The electric circuitry may be configured to regulate a supply of power to the heater. Power may be supplied to the heater continuously following activation of the device or may be supplied intermittently, such as on a puff-by-puff basis. The power may be supplied to the heater in the form of pulses of electrical current.

The heater may be arranged on a surface of the SAW-atomizer, e.g., next to the atomization region or opposite the atomization region. For example, the heater may be arranged on a same surface of the SAW-atomizer as the atomization region. Such an arrangement allows a direct physical or close contact of the heater and the liquid aerosol-forming substrate to be heated, in particular close to the atomization region. A heater may, for example, surround or partly surround the aerosol-forming substrate in the atomization region.

In some arrangements according to example embodiments, where the heater is arranged on a surface of the SAW-atomizer opposite the atomization region, a supply of aerosol-forming substrate to the atomization region is not altered by the presence of the heater. In addition, the heater may be arranged in a position of the atomization region but on an opposite side of a substrate of the SAW-atomizer A size of the heater may correspond to the size of the SAW-atomizer A size of the heater may also be limited to the size of an atomization region. For instance, the size of a heater may at least correspond to the size of the atomization region. The position of the heater may be shifted in a direction of a supply element. This allows heating of the liquid before the liquid is in the atomization region. In an example embodiment, the heat of the heater is transferred through the substrate of the SAW-atomizer by heat conduction.

The positions of the heater as described may improve heat transfer between the heater and the liquid aerosol-forming substrate on the SAW-atomizer.

The heater may be a separate heater attached to the SAW-atomizer or arranged next or near the SAW-atomizer.

The heater may be integral with the SAW-atomizer. This may reduce the number of component parts of the device and simplify manufacture.

The heater may be in a heat conductive relationship with the SAW-atomizer.

The heater may also be arranged on or within the housing of the liquid storage portion. In this non-limiting arrangement, the liquid aerosol-forming substrate will be at an elevated temperature when being supplied from the liquid storage portion to the SAW-atomizer.

The heater may be any suitable heater capable of heating a liquid aerosol-forming substrate. In an example embodiment, the heater may be an electrically operated heater. For instance, the heater may be a resistive heater. The heater may comprise inductive heating means. The heater may be substantially flat to simplify manufacturing. As used herein, the term 'substantially flat' means formed in a single plane and not wrapped around or otherwise conformed to fit a curved or other non-planar shape. A flat heater may be handled with relative ease during manufacture and may provide for a robust construction.

The heater may comprise one or more electrically conductive tracks on an electrically insulating substrate. The electrically insulating substrate may comprise any suitable material and may be a material that is able to tolerate relatively high temperatures (e.g., in excess of 150 degrees Celsius) and rapid temperature changes. An example of a suitable material is a polyimide film, such as Kapton®.

The control system configured to operate the heater or the SAW-atomizer or both may comprise an ambient temperature sensor to detect the ambient temperature. For instance, the control system may comprise a temperature sensor on the SAW-atomizer to detect the temperature of the liquid aerosol-forming substrate in the atomization region. One or more temperature sensors may be in communication with the control electronics of the aerosol-generating device to enable the control electronics to maintain the temperature of the liquid aerosol-forming substrate at the predetermined, target, or desired temperature. The one or more temperature sensors may be a thermocouple or a resistive temperature sensor. The heater may be used to provide information relating to the temperature. Temperature-dependent resistive properties of the heater may be known and used to determine the temperature of the at least one heater in a manner known to a person of ordinary skill in the art.

In the smoking device, a portion of the supply element may be arranged adjacent the atomization region of the SAW-atomizer, while another portion of the supply element may be fluidly connectable to the liquid storage portion. The portion of the supply element arranged adjacent the atomization region may extend into the atomization region. In a ready to be used state of the smoking device, the supply element may allow the transport of liquid aerosol-forming substrate from a liquid storage portion, for example from within a cartridge to the atomization region. Thereby, the other portion of the supply element may be directly connected to the liquid storage portion, for example inserted into or arranged adjacent a content of the liquid storage portion. However, the aerosol-forming substrate may also be transported out of the liquid storage portion in other ways, for example via a liquid passageway so as to be in fluid connection with the other portion of the supply element further downstream of a liquid transport from the storage portion to the SAW-atomizer A separation of the liquid transport may enhance variability and optimization in liquid transport means from a liquid storage portion to the SAW-atomizer. In particular, a supply element for the supply of a liquid aerosol-forming substrate to the SAW-atomizer may be optimized for liquid supply to and distribution over the atomization region. Alternatively, or in addition, the liquid transport out of the liquid storage portion may be optimized.

The supply element may be, but is not limited to, a capillary element, such as, for example, a wick or a strip of paper, a capillary or a piercing element for piercing a cartridge containing the liquid aerosol-forming substrate.

In an example embodiment, the supply element may be a capillary element having a capillary action for a liquid aerosol-forming substrate. The supply element in the form of a capillary element may enable a liquid aerosol-forming substrate to be supplied to the atomization region of the SAW-atomizer. The capillary element consists of or comprises a material such that the liquid aerosol-forming substrate is transferred by a capillary effect. A capillary material is a material with an affinity for conveying liquid from one end of the material to another. The capillary material may be oriented in the device to convey liquid aerosol-forming substrate to the atomization region on the surface of the SAW-atomizer. The capillary material may have a fibrous structure and/or a spongy structure. For instance, the capillary material may comprise a bundle of capillaries, a plurality of fibres, a plurality of threads, or may comprise fine bore tubes. The capillary material may comprise a combination of fibres, threads, and fine-bore tubes. The fibres, threads, and fine-bore tubes may be generally aligned to convey liquid to the SAW-atomizer. Alternatively, or in addition, the capillary material may comprise a sponge-like material or a foam-like material. The structure of the capillary material may form a plurality of small bores or tubes, through which the liquid can be transported by capillary action.

The capillary material may comprise any suitable material or combination of materials. Examples of suitable materials are a sponge or foam material, ceramic-, paper-, or graphite-based materials in the form of fibres or sintered powders, foamed metal or plastics materials, sheet material, fibrous material, for example made of spun or extruded fibres, such as cellulose acetate, polyester, or bonded polyolefin, polyethylene, terylene or polypropylene fibres, nylon fibres or ceramic. The capillary material may be paper-based. The capillary material may have any suitable level of capillarity and porosity so as to be used with different liquid physical properties.

The liquid aerosol-forming substrate has physical properties, including (but not limited to) viscosity, surface tension, density, thermal conductivity, and boiling point, which allow the liquid to be transported through the capillary material of the capillary element by capillary action. The capillary element may be configured to convey the liquid aerosol-forming substrate to the atomization region of the SAW atomizer. The capillary element may be in the form of a sheet. Some capillary material, such as for example paper-based wick material, may additionally have the capability of filtering contaminants from the liquid, thus facilitating the atomization of a purer liquid aerosol-forming substrate.

The supply element may be a separate element or may be part of the SAW-atomizer. In an example embodiment, the supply element is part of (e.g., integral with) the SAW-atomizer.

The supply element may be a wick element known in the art using capillary effects for transporting a liquid. The supply element may also use, for example, the Venturi effect, to transport liquid to the atomization region. The supply element may, for example, be microchannels integrated into a substrate of a SAW-atomizer or any combination of the above mentioned supply elements.

The SAW-atomizer may comprise at least one piezoelectric transducer. The SAW-atomizer may comprise at least one interdigital transducer. The piezoelectric transducer may comprise a monocrystalline material but may also comprise a polycrystalline material. The piezoelectric transducer may comprise quartz, a ceramic, barium titanate ($BaTiO_3$), lithium niobate ($LiNbO_3$). The ceramic may comprise lead zirconate titanate (PZT). The ceramic may include doping materials such as Ni, Bi, La, Nd, or Nb ions. The piezoelectric transducer may be polarized. Alternatively, the piezoelectric transducer may be unpolarized. In another instance, the piezoelectric transducer may comprise both polarized and unpolarized piezoelectric materials.

The SAW-atomizer may comprise one transducer for generating surface acoustic waves. However, depending on the configuration, the SAW-atomizer may comprise more than one transducer for generating surface acoustic waves. Transducers generating surface acoustic waves are called input transducers. Input transducers receive an electrical signal and generate surface acoustic waves according to the input signal. More than one input transducer may generate surface acoustic waves to interfere with each other (e.g., positive interference to enhance an energy input into the atomization region). An additional input transducer may be used to center the liquid in the atomization region or generally to center the liquid in a relatively small zone.

If the SAW-atomizer comprises more than one transducer, at least one transducer (of the more than one transducers) may be used for generating an electrical signal.

Transducers generating an electrical signal are called output transducers. An output transducer converts surface acoustic waves into an output signal. In an example embodiment, the surface acoustic waves received by the output transducer have been generated by the at least one input transducer and have propagated along the atomization region of the SAW-atomizer to the output transducer. The output signal may comprise information on physical processes in the atomization region, for example, on an amount of liquid present in the atomization region. Thus, the SAW-atomizer may be used as a SAW-sensor gaining information on the atomization process. This information may be used for controlling the atomization process. Sensor information may, for example, be used in the control system for controlling the operation of the SAW-atomizer or, for example, controlling a heater. A control of the atomization process may, for example, be achieved via an adjustment of power supplied to the SAW-atomizer.

The SAW-atomizer comprises at least a second transducer. The at least a second transducer may be used for generating an electrical signal representative of the physical information of the atomization region. Alternatively, the at least a second transducer may be used for generating further surface acoustic waves.

If two transducers are present, the two transducers may be arranged opposite each other with the atomization region arranged in between the two transducers. A first one of the two transducers may be an input transducer. A second one of the two transducers may be an input or an output transducer.

In the smoking device, the liquid storage portion, the SAW-atomizer, and the supply element may form parts of a cartridge. A cartridge including or excluding the SAW-atomizer and supply element may be pre-manufactured. The cartridge may be removable, replaceable, reusable, or disposable. The cartridge may be refillable with a liquid aerosol-forming substrate. With a refillable liquid storage portion or in particular with a replaceable cartridge, the smoking device becomes reusable. In an example embodiment, the cartridge is not refillable and is replaced after every use.

The device housing may comprise a cavity for receiving the cartridge.

The cartridge may be removably coupled to the aerosol-generating device. The cartridge may be removed from the aerosol-generating device when the aerosol-forming substrate has been consumed. As used herein, the term 'removably coupled' is used to mean that the cartridge and device can be coupled and uncoupled from one another without significantly damaging either the device or cartridge.

The cartridge may be manufactured at a relatively low cost and in a reliable and repeatable fashion. The cartridge may have a simple design. The cartridge may have a housing within which an aerosol-forming substrate is held.

The cartridge may comprise a liquid retention material holding an aerosol-forming liquid. For example, the cartridge may be a tank system filled with liquid.

The cartridge housing may be a rigid housing. As used herein 'rigid housing' means a housing that is self-supporting. The housing may comprise a material that is impermeable to liquid.

The cartridge may comprise a lid or cover. The lid or cover may be peelable before coupling the cartridge to the aerosol-generating device. The lid or cover may also be pierceable, for example, by the supply element.

A cartridge comprising a supply element and an SAW-atomizer allows for a new atomization process each time a cartridge is replaced. Deposits or residues in the supply element and/or on the SAW-atomizer may be removed upon replacing a cartridge. The SAW-atomizer including a supply element may also be reusable and fixedly mounted elements of the smoking device. With this configuration, waste and material cost may be reduced.

According to another example embodiment, there is provided a method for generating an aerosol in a smoking system. The method comprises providing a surface acoustic wave-atomizer (SAW-atomizer) comprising an atomization region, at least one transducer and at least a second transducer. The method further comprises the step of providing a liquid aerosol-forming substrate to the atomization region of the SAW-atomizer and operating the SAW-atomizer, thereby generating surface acoustic waves with the at least one transducer, the surface acoustic waves generated to propagate along a surface of the SAW-atomizer into the atomization region and into the liquid aerosol-forming substrate in the atomization region, thereby atomizing the liquid aerosol-forming substrate and generating the aerosol. The method may be performed using a smoking device, a smoking system, and a cartridge in accordance with other aspects of example embodiments.

The method may have all the advantages described in relation to the other aspects of example embodiments. Features of the SAW-atomizer (e.g., operation modes), the supply element (e.g., its arrangement and construction), and the heater (e.g., predetermined, target, or desired temperatures) may be the same as those described in relation to other aspects of example embodiments.

The method may comprise the step of fluidly connecting a liquid storage portion, for example a cartridge, comprising the liquid aerosol-forming substrate with the atomization region of the SAW-atomizer.

The method may comprise the step of providing a radio frequency signal to the at least one transducer.

The method may further comprise the step of supplying an amount of liquid aerosol-forming substrate to the SAW-atomizer, the amount of liquid corresponding to one puff.

The method may comprise the step of heating the liquid aerosol-forming substrate in the atomization region to a temperature above room temperature (e.g., before atomization). Heating may be performed such that the liquid to be atomized has a temperature above 50 degrees Celsius, for example, a temperature between 50 and 80 degrees Celsius.

The method may further comprise the step of providing the SAW-atomizer with at least a second transducer.

The method may then comprise the steps of outputting a signal with the at least one second transducer. The output signal is representative of a physical process in the atomization region. Said output signal may be used for controlling the operation of the SAW-atomizer. For example, the output signal may be used as input signal into the control system for controlling the SAW-atomizer and/or a heater.

Alternatively, the method may comprise the step of generating further surface acoustic waves with the at least a second transducer, the further surface acoustic waves generated to propagate along the surface of the SAW-atomizer into the atomization region and into the liquid aerosol-forming substrate in the atomization region.

According to another aspect of example embodiments, there is provided an aerosol-generating smoking system comprising a smoking device as described herein. The system also comprises a liquid aerosol-forming substrate. A supply element is in fluid connection with the liquid aerosol-forming substrate comprised in a housing of a liquid storage portion of the smoking device and with an atomization region on a surface acoustic wave-atomizer (SAW-atomizer).

The liquid aerosol-forming substrate comprises at least one aerosol former and a liquid additive. The aerosol-former may, for example, be propylene glycol or glycerol.

The liquid aerosol-forming substrate may comprise water.

The liquid additive may be any one or a combination of a liquid flavour or liquid stimulating substance. The liquid flavour may, for example, comprise tobacco flavour, tobacco extract, fruit flavour, or coffee flavour. The liquid additive may, for example, be a sweet liquid such as, for example, vanilla, caramel, and cocoa, a herbal liquid, a spicy liquid, or a stimulating liquid containing, for example, caffeine, taurine, nicotine, or other stimulating agents known for use in the food industry.

According to yet another aspect of example embodiments, there is provided a cartridge for smoking devices for aerosol-generation. The cartridge comprises a liquid storage portion comprising a housing for holding liquid aerosol-forming substrate. The cartridge further comprises a surface acoustic wave-atomizer (SAW-atomizer) comprising an atomization region, at least one transducer for generating surface acoustic waves to propagate along a surface of the SAW-atomizer including the atomization region, and at least a second transducer. A supply element is provided and arranged to supply liquid aerosol-forming substrate from the housing of the liquid storage portion to the atomization region on the SAW-atomizer.

The liquid storage portion, the SAW-atomizer, the supply element, and/or a heater may comprise any features or may be arranged in any configuration as described above in relation to the liquid storage portion, the SAW-atomizer, the supply element, and heater of the aerosol-generating device as described herein. Advantages and features of the cartridge have been described relating to the smoking device and will not be repeated for purposes of brevity.

According to a further aspect, there is provided a smoking device for aerosol-generation of a liquid aerosol-forming substrate. The smoking device comprises a device housing comprising a liquid storage portion comprising a housing for holding liquid aerosol-forming substrate. The device housing may, for example, comprise a cavity for receiving a cartridge therein, the cartridge comprising a liquid aerosol-forming substrate. The smoking device further comprises a surface acoustic wave-atomizer (SAW-atomizer) comprising an atomization region and at least one transducer for generating surface acoustic waves to propagate along a surface of the SAW-atomizer including the atomization region. A supply element is arranged to supply liquid aerosol-forming substrate from the liquid storage portion to the atomization region on the SAW-atomizer. The supply element may fluidly connect the liquid storage portion, for example a cartridge, and the SAW-atomizer (e.g., the atomization region on the SAW-atomizer). A control system is configured to operate the SAW-atomizer for atomizing the liquid aerosol-forming substrate in the atomization region to generate an aerosol. The control system may, for example, comprise a power source and control electronics connected to the SAW-atomizer. The control system is, for example, adapted to provide an RF-signal to the at least one transducer. The generated aerosol may then be transported in the device housing to a downstream end of the smoking device.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
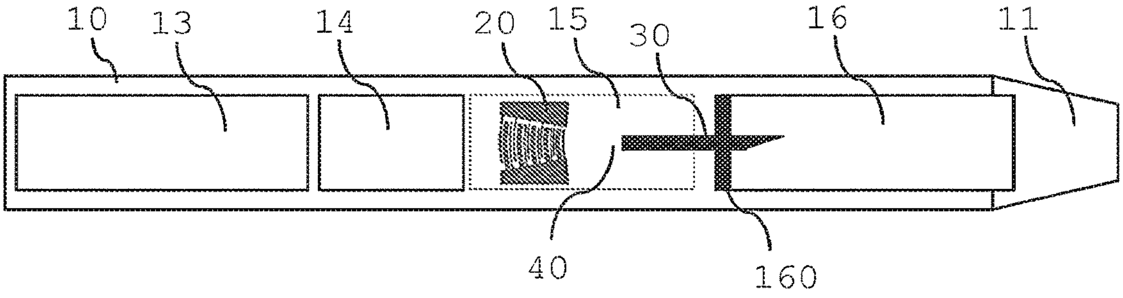
FIG. 1 schematically illustrates an aerosol-generating device with a pierceable cartridge and a SAW-atomizer comprising a focusing transducer according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 shows an electronic aerosol-generating device comprising a housing 10 and a mouthpiece 11. The housing comprises a cartridge 16 containing an aerosol-forming substrate (e.g., an aerosol-forming liquid), a surface acoustic wave-atomizer (SAW-atomizer) chip 15, electronics 14 for operating and controlling the SAW-atomizer chip 15, and a battery 13 providing power to the electronics 14 and the SAW-atomizer chip 15. The SAW-atomizer chip 15 may be a rectangular chip comprising a focusing interdigital transducer 20 including a reflector, which will be described in more detail below.

The cylindrically-shaped cartridge 16 is closed at its distal end facing the SAW-atomizer chip 15 with a sealing element, for example a pierceable or perforable foil 160. The sealing element is configured to be pierced by a supply element in the form of a pointed capillary element 30, for example a needle or a paper strip. The other, distal end of the capillary element 30 reaches to the focusing zone of the transducer 20 on the SAW-atomizer chip 15, the focusing zone corresponding to the atomization region 40 or vaporization region on the SAW-atomizer chip 15.

Figure 2:
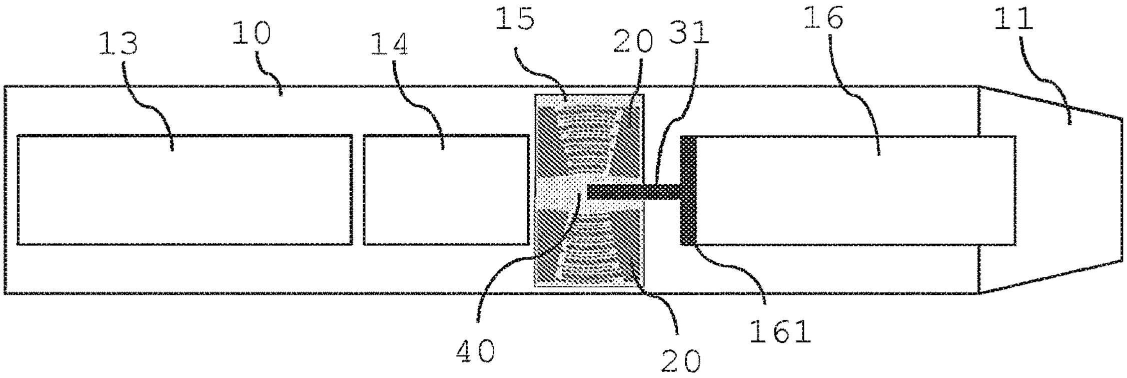
FIG. 2 schematically illustrates an aerosol-generating device with a SAW-atomizer comprising two focusing transducers according to an example embodiment.

FIG. 2 shows another example embodiment of an electronic aerosol-generating device, wherein the same reference numbers are used for the same or similar elements. In FIG. 2, the SAW-atomizer chip 15 comprises two focusing interdigital transducers 20 arranged opposite each other. The atomization region 40 lies in between the two transducers 20.

Both transducers 20 may be operated to generate surface acoustic waves. By doing this, atomization in the atomization region 40 may be enhanced or less power may be required for achieving a same vaporization rate. Alternatively, one of the two transducers 20 may be operated to provide a signal representative of the effects or condition in the atomization region 40, for example a vaporization rate or presence or absence of liquid. Said signal may be used in the electronics 14 to control and possibly adapt the atomization process.

In the example embodiment of FIG. 2, the distal end of the cartridge 16 is closed by a layer of porous material 161. The porous material 161 is in contact with a wick 31, for example a strip or strand of fibers or paper strip, the wick 31 extending from the porous material 161 to the atomization region 40 on the SAW-atomizer chip 15. Due to the arrangement of the two transducers 20 having a wave propagation direction substantially perpendicular to the longitudinal axis of the device, the wick 31 lies in between the two transducers 20.

Figure 3:
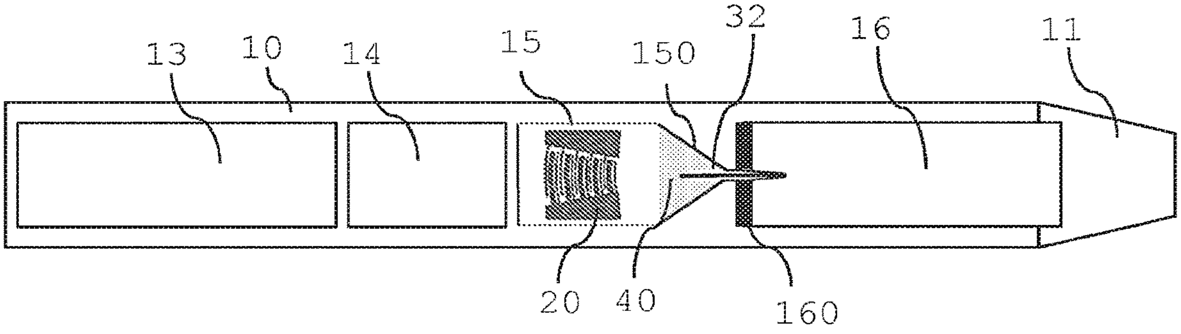
FIG. 3 schematically illustrates an aerosol-generating device with a pierceable cartridge and a pointed SAW-atomizer comprising a focusing transducer according to an example embodiment.

FIG. 3 shows another example embodiment of an electronic aerosol-generating device, similar to the one shown in FIG. 1, wherein the same reference numbers are used for the same or similar elements. In FIG. 3, the SAW-atomizer chip 15 comprises a pointed tip portion 150 supporting a piercing of a pierceable membrane or foil 160 of the cartridge 16. A capillary 32 is arranged to extend between the inside of the cartridge 16 and the atomization region 40 of the SAW-atomizer chip 15. The capillary 32 may, for example, be a microchannel.

An optional heater may be arranged on each side of the capillary 32, on top of the capillary 32, or on the back side of the SAW-atomizer chip 15.

FIGS. 4 to 17 show different non-limiting embodiments of SAW-atomizer chips 15 and examples of the arrangement and embodiments of the transducers, capillary elements, and heating elements.

Figure 4:
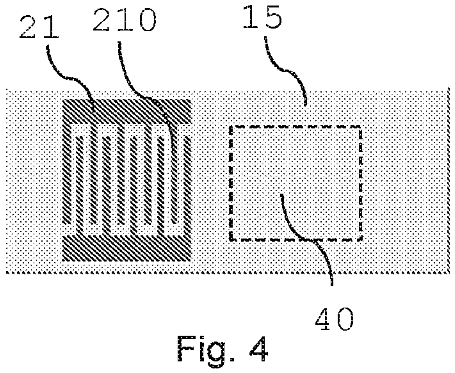
FIG. 4 shows a SAW-atomizer with a straight transducer according to an example embodiment.

In FIG. 4, one interdigital transducer 21 is arranged on a lateral surface portion of a piezoelectric substrate. The transducer 21 comprises a series of straight interlacing electrodes 210 arranged in parallel (straight transducer). The atomization region 40 is indicated by a dotted line and is arranged near the transducer 21 but on an opposite lateral surface portion of the piezoelectric substrate.

Figure 5:
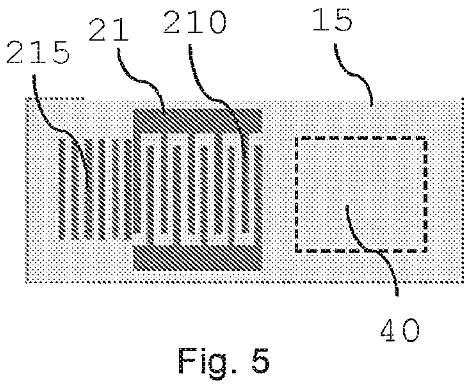
FIG. 5 shows the SAW-atomizer of FIG. 4 with a reflector according to an example embodiment.

In FIG. 5, the same transducer 21 (as in FIG. 4) is provided with reflector electrodes 215. The straight reflector electrodes 215 are arranged parallel to the electrodes 210 of the transducer 21 and adjacent the side of the transducer 21 opposite the side facing the atomization region 40. The reflector electrodes 215 may reflect surface acoustic waves back into the intended propagation direction (to the right side in the drawing). The transducer 21 may, for example, have 20 electrode pairs and 32 reflector electrodes 215 arranged on a $LiNbO_3$ substrate. The electrode material may be gold.

Figure 6:
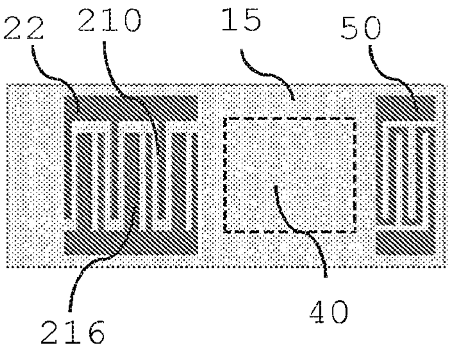
FIG. 6 shows a SAW-atomizer comprising a straight transducer with a different reflector and an additional heating element according to an example embodiment.

In FIG. 6, a straight transducer 22 may comprise reflector electrodes 216 arranged in between the transducer electrodes 210. A heating element, for example a resistive heater 50 in the form of a printed circuit path, is arranged on the substrate opposite the atomization region 40.

Figure 7:
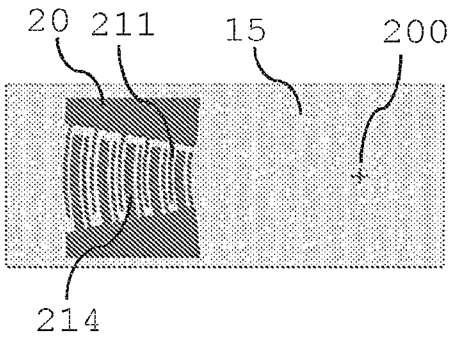
FIG. 7 shows a SAW-atomizer with a focusing transducer according to an example embodiment.

FIG. 7 is an example of a focusing interdigital transducer 20 having curved and tapering electrodes 211 focusing the generated waves onto a small focusing zone 200 on the surface of the substrate. In between the transducer electrodes 211, curved reflector electrodes 214 are arranged parallel to the transducer electrodes 211.

Figure 8:
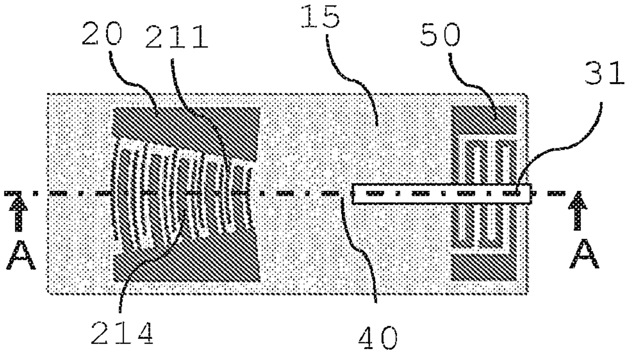
FIGS. 8-9 show a top view and a cross-sectional view (along midline A-A) of a SAW-atomizer with a focusing transducer, heating element, and capillary element according to an example embodiment.

FIG. 8 shows the SAW-atomizer chip 15 of FIG. 7 with an integrated heater 50 on the surface of the SAW-atomizer chip 15 and a capillary element or wick 31 in the form of a strip, for example a wick or capillary, arranged over the heater 50 substantially along the direction of the propagation direction of the waves generated by the transducer 20.

Figure 9:
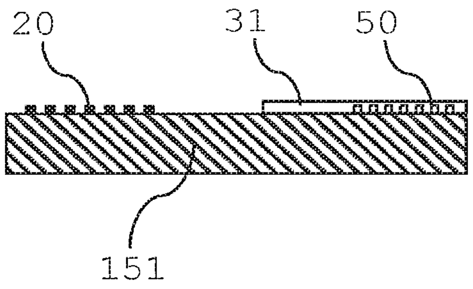

FIG. 9 is a cross-section view of the chip of FIG. 8. The transducer 20 and the heater 50 are arranged on the same surface, the top surface, of the piezoelectric substrate 151, for example a lithium niobate substrate. The wick 31 is partially arranged over the heater 50 and in close contact (e.g., thermal contact) to support the heating of the liquid transported in the wick 31 from a cartridge (not shown) to the atomization region arranged between the transducer 20 and the heater 50.

Figure 10:
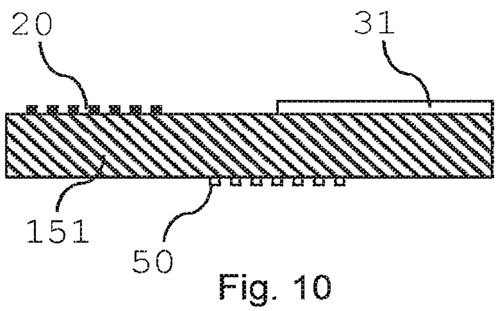
FIGS. 10-11 show cross-sectional views along midlines of further example embodiments of SAW-atomizers with heating elements.
Figure 11:
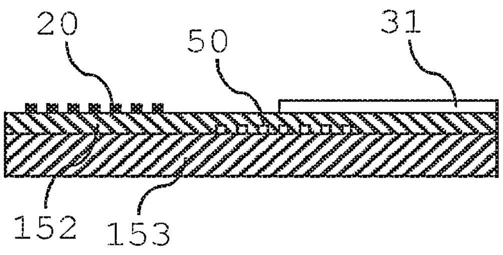

FIG. 10 and FIG. 11 show cross-sectional views of further example embodiments of SAW-atomizer chips 15. In FIG. 10, the heater 50 is arranged on an opposite side, the back side, of the substrate 151. The heater 50 is positioned to 'extend' into the atomization region and 'overlap' with the wick 31 (e.g., with the substrate 151 in between). In order to reduce the distance the heat has to pass through the substrate 151 to arrive at the liquid in the wick 31 or in the atomization region, the thickness of the piezoelectric substrate 151 may be reduced.

In FIG. 11, the transducer 20 and wick 31 are arranged on the surface of a piezoelectric layer 152, for example $LiNbO_3$, ZnO, AlN, or other piezoelectric materials suitable for layers for SAW-atomizer applications. The heater 50 is arranged on the back side of the piezoelectric layer 152 at approximately a same relative position as described and shown in FIG. 10. The piezoelectric layer 152 is arranged on a support 153, for example a substrate made of glass, ceramic, silicon, or metal. For manufacturing reasons, the heater 50 may be initially applied to the substrate or support 153, and the substrate or support 153 is then provided with the piezoelectric layer 152.

While the heater has been shown to be arranged on the SAW-atomizer chip, a heater may also be arranged, for example, along a capillary material or channel between the SAW-atomizer chip and a cartridge comprising aerosol-forming liquid.

Figure 12:
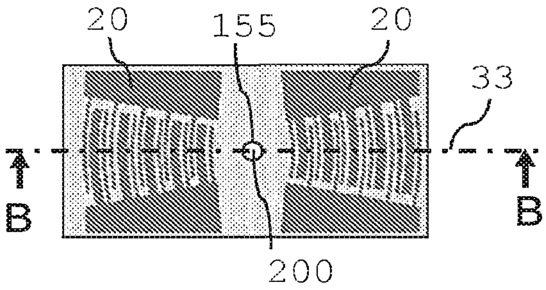
FIGS. 12-13 show a top view of and a cross-sectional view (along midline B-B) of a SAW-atomizer with two focusing transducers according to an example embodiment.
Figure 13:
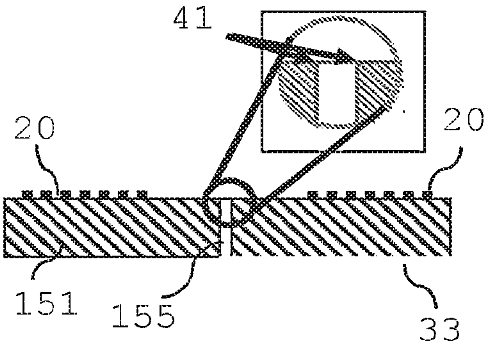

In FIG. 12 and FIG. 13, two focusing transducers 20 provided with reflector electrodes are arranged opposite each other on a piezoelectric substrate 151. The two transducers 20 have a common focusing zone 200 in between the transducers 20. In the focusing zone 200, the substrate 151 is provided with a through hole 155 through which an aerosol-forming liquid may be supplied to the top surface of the substrate 151. A capillary element 33 is arranged below the substrate 151 for liquid supply to the bottom of the through hole 155. Optionally, the through hole 155 may be filled with capillary material. In this example embodiment, the atomization area 41 is concentrated on the edges of the through hole 155 at the surface of the substrate 151. The sharp edges support the formation of a relatively thin aerosol-forming liquid layer, which facilitates its vaporization.

Figure 14:
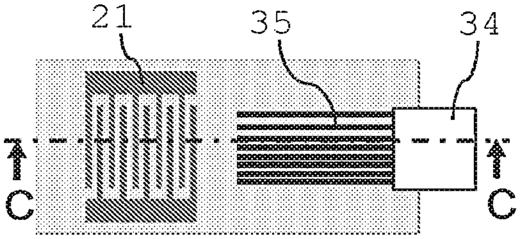
FIGS. 14-15 show a top view of and a cross-sectional view (along midline C-C) of a SAW-atomizer with a supply element comprising microchannels according to an example embodiment.
Figure 15:
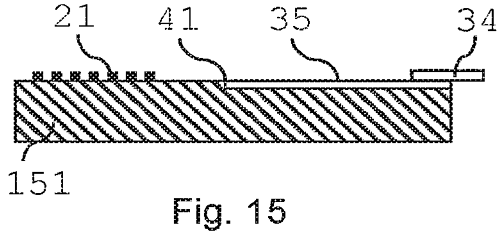

In FIG. 14 and FIG. 15, an aerosol-forming liquid is supplied to the SAW-atomizing chip via a capillary element in the form of a sheet of wick material 34. The sheet of wick material 34 extends onto the surface of the substrate 151 and partially overlies a series of parallel microchannels 35 provided in the surface of the substrate 151. The microchannels 35 extend into the atomization region of the straight transducer 21 also arranged on the surface of the substrate 151. In such an arrangement, the atomization area 41 is concentrated onto the edges of the microchannels 35.

Figure 16:
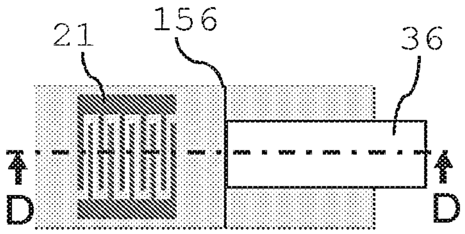
FIGS. 16-17 show a top view of and a cross-sectional view (along midline D-D) of a SAW-atomizer with a countersunk supply element according to an example embodiment.
Figure 17:
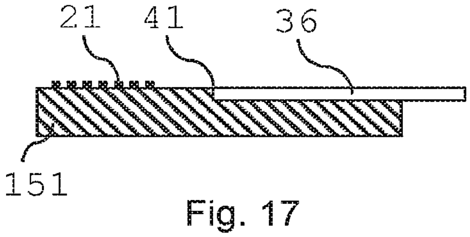

Similarly, in FIG. 16 and FIG. 17, an atomization area 41 is concentrated on an edge 156 of a substrate 151 by virtue of a countersunk capillary element 36. A portion of the surface of the substrate 151 has been removed, for example by etching. Onto this lower level surface portion, a capillary element 36, such as for example a strip of paper, is arranged flush with the edge 156 of the lower portion to enable liquid to be transported to the edge 156.

Figure 18:
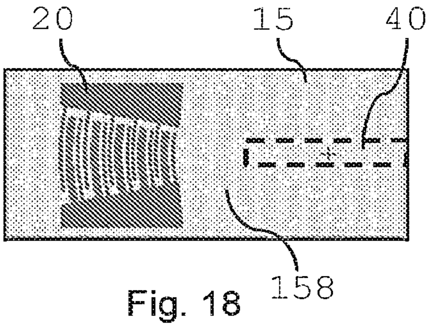
FIG. 18 shows a surface treatment of a SAW-atomizer according to an example embodiment.

Also surface treatment of the substrate 151 may support the formation of relatively thin aerosol-forming liquid layers. Surface treatment may also support a localization of such a layer. For example, and as shown in FIG. 18, an atomization region 40 (indicated by dotes lines) may be treated in order to form a hydrophilic area, while regions outside an indented atomization region may be hydrophobic areas 158.

Suitable power ranges to operate an SAW-atomizer chip comprising one or two transducers in the aerosol-generating device may be less than 20 Watts (e.g., between 5 Watts to 15 Watts). Typical transducer electrode distances are in a range of about 100 micrometers (straight transducers), while reflector distances may be in a range of about 50 micrometers.

Suitable sizes of rectangular SAW-atomizer chips comprising two transducers may range from about 50 mm by 20 mm to 55 mm by 25 mm.

The aerosol-forming liquid compositions may be 40 percent to 80 percent propylene glycol, 20 percent water, and 0 percent to 40 percent glycerol. The aerosol-generating liquid may be heated to about 65 degrees Celsius. An amount of about 5 microliters of such a liquid may be atomized or vaporized in less than 20 seconds, thus achieving a vaporization rate of about 0.2 to 0.3 microliters per second or higher.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating device, comprising:

a storage portion configured to hold an aerosol-forming substrate;

a surface acoustic wave atomizer (SAW-atomizer) configured to atomize the aerosol-forming substrate to generate an aerosol, the SAW-atomizer including, an atomization region on a substrate of the SAW-atomizer, and at least one transducer configured to generate surface acoustic waves that propagate along a surface of the substrate of the SAW-atomizer including the atomization region;

a supply element configured to supply the aerosol-forming substrate from the storage portion to the atomization region;

a resistive heater configured to heat the aerosol-forming substrate, the resistive heater arranged directly on a surface of the substrate of the SAW-atomizer opposite the atomization region; and a control system configured to operate the SAW-atomizer to atomize the aerosol-forming substrate in the atomization region to generate the aerosol.

2. The aerosol-generating device of claim 1, wherein the at least one transducer is an interdigital transducer including electrodes arranged on the substrate, the substrate being a piezoelectric substrate.

3. The aerosol-generating device according to claim 1, wherein the control system is configured to operate the resistive heater to heat the aerosol-forming substrate to a predetermined temperature.

4. The aerosol-generating device of claim 1, wherein a portion of the supply element is arranged adjacent the atomization region of the SAW-atomizer and another portion of the supply element is fluidly connected to the storage portion.

5. The aerosol-generating device of claim 1, wherein:

the aerosol-forming substrate is a liquid; and the supply element is a capillary element configured to supply the aerosol-forming substrate to the atomization region of the SAW-atomizer via capillary action.

6. The aerosol-generating device of claim 1, wherein:

the at least one transducer includes a first transducer and a second transducer;

the first transducer is configured to generate first surface acoustic waves; and the second transducer is configured to generate an electrical signal that is representative of physical information of the atomization region or to generate second surface acoustic waves.

7. The aerosol-generating device of claim 6, wherein the first transducer is an interdigitated transducer including tapering electrodes and curved reflector electrodes parallel to the tapering electrodes such that the generated first surface acoustic waves are focused onto the atomization region.

8. The aerosol-generating device of claim 1, further comprising a device housing.

9. The aerosol-generating device of claim 8, wherein:

the storage portion, the SAW-atomizer, and the supply element are included in a cartridge; and the device housing defines a cavity configured to receive the cartridge.

10. The aerosol-generating device of claim 1, wherein the atomization region includes a hydrophilic region.

11. The aerosol-generating device of claim 1, wherein the aerosol-forming substrate comprises a liquid including at least one aerosol former and a liquid additive.

12. A cartridge for an aerosol-generating system, comprising:

a storage portion including a housing configured to hold an aerosol-forming substrate;

a surface acoustic wave atomizer (SAW-atomizer) configured to atomize the aerosol-forming substrate to generate an aerosol, the SAW-atomizer including, an atomization region on a substrate of the SAW-atomizer, and at least one transducer configured to generate surface acoustic waves that propagate along a surface of the substrate of the SAW-atomizer including the atomization region;

a supply element configured to supply the aerosol-forming substrate from the storage portion to the atomization region; and a resistive heater configured to heat the aerosol-forming substrate, the resistive heater arranged directly on a surface of the substrate of the SAW-atomizer opposite the atomization region.

13. The cartridge of claim 12, wherein the at least one transducer is an interdigital transducer including electrodes arranged on the substrate, the substrate being a piezoelectric substrate.

14. The cartridge of claim 12, wherein a portion of the supply element is arranged adjacent the atomization region of the SAW-atomizer and another portion of the supply element is fluidly connected to the storage portion.

15. The cartridge of claim 12, wherein:

the aerosol-forming substrate is a liquid; and the supply element is a capillary element configured to supply the aerosol-forming substrate to the atomization region of the SAW-atomizer via capillary action.

16. The cartridge of claim 12, wherein:

the at least one transducer includes a first transducer and a second transducer;

the first transducer configured to generate first surface acoustic waves; and the second transducer configured to generate an electrical signal that is representative of physical information of the atomization region or to generate second surface acoustic waves.

17. The cartridge of claim 16, wherein the first transducer is an interdigitated transducer including tapering electrodes and curved reflector electrodes parallel to the tapering electrodes such that the generated first surface acoustic waves are focused onto the atomization region.

18. The cartridge of claim 12, wherein the atomization region includes a hydrophilic region.

* * * * *